(12) United States Patent
Boland

(10) Patent No.: US 11,358,570 B2
(45) Date of Patent: Jun. 14, 2022

(54) WINDSCREEN WIPER ARM, PARTICULARLY FOR AUTOMOBILES

(71) Applicant: TRICO BELGIUM SA, Aubange (BE)

(72) Inventor: Xavier Boland, Arlon (BE)

(73) Assignee: TRICO BELGIUM SA, Aubange (BE)

( * ) Notice: Subject to any disclaimer, the term of this patent is extended or adjusted under 35 U.S.C. 154(b) by 0 days.

(21) Appl. No.: 17/050,649

(22) PCT Filed: Apr. 26, 2018

(86) PCT No.: PCT/EP2018/060750
§ 371 (c)(1),
(2) Date: Oct. 26, 2020

(87) PCT Pub. No.: WO2019/206415
PCT Pub. Date: Oct. 31, 2019

(65) Prior Publication Data
US 2021/0061235 A1 Mar. 4, 2021

(51) Int. Cl.
*B60S 1/52* (2006.01)
*B60S 1/40* (2006.01)

(52) U.S. Cl.
CPC ............ *B60S 1/522* (2013.01); *B60S 1/4045* (2013.01)

(58) Field of Classification Search
CPC .. B60S 1/52; B60S 1/522; B60S 1/524; B60S 1/4045; B60S 1/4048; B60S 2001/4051; B60S 2001/4054; B60S 2001/4058; B60S 2001/4061

USPC ............. 15/250.04, 250.351, 250.32
See application file for complete search history.

(56) References Cited

U.S. PATENT DOCUMENTS

2017/0008493 A1* 1/2017 Schaeuble ............. B60S 1/3415
2019/0152442 A1* 5/2019 Umeno .................. B60S 1/4006

FOREIGN PATENT DOCUMENTS

| DE | 102014205538 | 10/2015 |
|----|--------------|---------|
| EP | 1985513 | 10/2008 |
| EP | 3115265 | 1/2017 |
| FR | 3043969 | 5/2017 |

* cited by examiner

*Primary Examiner* — Gary K. Graham
(74) *Attorney, Agent, or Firm* — Bryan Cave Leighton Paisner LLP

(57) ABSTRACT

A windscreen wiper arm, particularly for automobiles, that is able to oscillate upwardly and downwardly between a downward position and an upward position. One end of the windscreen wiper arm is adapted to be pivotally connected to a mounting head mounted on a drive shaft. Another end of the windscreen wiper arm is rigidly connected to an adapter adapted to be connected to an elongated wiper blade to be placed in abutment with a windscreen to be wiped. The adapter, at the location of its connection to the wiper blade, has a U-shaped cross-section with a base and two spaced-apart legs. The U-shaped cross-section is preferably mounted offset in a plane of the base relative to a longitudinal axis of the windscreen wiper arm. The windscreen wiper arm is provided with a nozzle for spraying a washing liquid onto the windscreen to be wiped. The nozzle is detachably connected to the adapter through a key hole connection.

15 Claims, 4 Drawing Sheets

WINDSCREEN WIPER ARM, PARTICULARLY FOR AUTOMOBILES

BACKGROUND OF THE INVENTION

German patent publication no. 34 33 106 (SWF Auto-Electric GmbH) discloses an oscillating windscreen wiper arm comprising an arm member pivotally connected to a mounting head by means of a pivot pin. The arm member has a substantially U-shaped cross-section near the pivot pin having two side walls. A part of the mounting head extends between the side walls and beyond the pivot pin. A spring is hooked with its first end on a pin on the mounting head. The arm member is connected to a wiper rod, where one end of the wiper rod extends inside the U-shaped cross-section of the arm member. The side walls of the arm member are locally folded around the wiper rod, while a holder is folded around the end of the wiper rod. The spring of this prior art windscreen wiper arm is hooked with its first end on the pin on the mounting head and with its second end on two eyes of the holder.

A disadvantage of the windscreen wiper arm known from the above German patent publication is that the windscreen wiper arm is often used in combination with a nozzle fixedly mounted on (or below) a bonnet of a car for spraying a washing liquid onto the car's windscreen to be wiped. In practice it has become apparent that the windscreen cannot effectively be cleaned by a combination of the known windscreen wiper arm and the nozzle, as the nozzle emits the washing fluid at a large distance relative to the windscreen, so that a relatively large amount of the washing fluid does not effectively reach a wiping pattern on the windscreen to be wiped. Further, it has become apparent that in the prior art, a large amount of liquid (consumption) is required in an attempt to clean the windscreen to be wiped. Further, if the washing fluid is spread onto the car's body instead of onto the windscreen to be wiped, it may damage the car. Indeed, ethanol, methanol and other components of the washing fluid are believed to have a corrosive effect on paint, rubber, car wax and plastics, for example.

SUMMARY OF THE INVENTION

It is an object of the invention to obviate these disadvantages, in the sense that at minimum costs—without using complex machinery and additional tools—a simple windscreen wiper arm is proposed to effectively clean a windscreen to be wiped, without damaging parts of a car, where less washing liquid is required to clean the windscreen to be wiped.

The present invention relates to a windscreen wiper arm, particularly for automobiles, that is able to oscillate upwardly and downwardly between a downward position and an upward position. One end of the windscreen wiper arm is arranged to be pivotally connected to a mounting head mounted on a drive shaft. Another end of the windscreen wiper arm is rigidly connected to an adapter arranged to be connected to an elongated wiper blade to be placed in abutment with a windscreen to be wiped. The adapter, at the location of its connection to the wiper blade, has a U-shaped cross-section with a base and two spaced-apart legs. The U-shaped cross-section is preferably mounted offset in a plane of the base relative to a longitudinal axis of the windscreen wiper arm.

In the framework of the present invention the windscreen wiper arm may comprise a wiper arm member having a substantially U-shaped cross-section, as well as a wiper rod. One end of the wiper arm member is arranged to be pivotally connected to the mounting head. Another end of the wiper arm member is rigidly connected to the wiper rod. One end of the wiper rod extends inside the U-shaped cross-section of the wiper arm member, and another end of the wiper rod is arranged, through the adapter, to be connected to the elongated wiper blade to be placed in abutment with a windscreen to be wiped.

The present invention particularly relates to a windscreen wiper arm for an elongated wiper blade in the form of a so-called flat blade, where an elastic elongated carrier element is provided. The flat blade includes at least one longitudinal groove, in which groove a longitudinal strip (also called a "flexor") of the carrier element is disposed. There is no restriction to the use of only one longitudinal strip forming the elastic carrier element that is particularly located in a central longitudinal groove of the flat blade. Instead, the carrier element may also comprise two longitudinal strips, where the strips are disposed in opposite longitudinal grooves of the flat blade. The groove(s) may be closed at one outer end. The flat blade comprises a connecting device (also indicated as a "connector") arranged to be connected to the windscreen wiper arm. Preferably, the connector is made in one piece, also called a "one piece connector." The flat blade comprises a spoiler at a side thereof facing away from the windscreen to be wiped, where the flat blade and the spoiler are preferably made in one piece through extrusion. The present invention is not limited to flat blades, but can also be applied in traditional windscreen wiper devices having yokes.

The mounting head is usually fixed for rotation to the shaft. The shaft is rotatable alternately in a clockwise and in a counter-clockwise sense carrying the mounting head into rotation. Thus, in turn the mounting head draws the connecting device into rotation and thereby moves the flat blade. In the alternative, the mounting head is fixed for translation to a carriage, where the carriage can be translated alternately in a one linear direction and in another counter linear direction carrying the mounting head into translation. The present invention can therefore be used for circular or linear movement of the mounting head.

According to the invention, a windshield wiper arm is provided with a nozzle for spraying a washing liquid onto the windscreen to be wiped. The nozzle is detachably connected to the adapter through a key hole connection. A keyhole connection enables a rapid and reliable joining of the nozzle and the adapter. By connecting the nozzle directly to the adapter of the windscreen wiper arm, the nozzle is not only fixed to the windscreen wiper arm in a reliable and controllable manner, although detachably in case of repair or replacement of the nozzle, but the nozzle is located at a very small distance relative to the windscreen to be wiped and is allowed to directly follow any oscillatory movement of the windscreen wiper arm, so that the washing fluid exiting the nozzle can be effectively sprayed thereon, with all positive consequences involved as to effective cleaning of the windscreen to be wiped and safe visibility for a driver. Further, the nozzle may be used as a first nozzle in combination with a second nozzle located on the windscreen wiper arm for spraying a washing liquid onto the windscreen to be wiped. In that case the washing liquid is sprayed from at least two locations (on the adapter and on the windscreen wiper arm) onto the windscreen to be wiped, namely washing liquid exiting from the first nozzle connected to the adapter, as well as washing liquid exiting from the second nozzle connected to the windscreen wiper arm. Thus, the windscreen can be cleaned efficiently over a very large wiping area thereof, particularly at high speeds. In that case, the first and second nozzles are preferably connected to only one inlet for the washing fluid, so that the first and second nozzles are in liquid contact with each other.

The present invention is not restricted to cars, but also refers to rail coaches and other (fast) vehicles.

In a preferred embodiment of a windscreen wiper arm in accordance with the invention, the key hole connection comprises a slot having an enlarged hole, a reduced hole and a restricted neck interconnecting the enlarged hole and the reduced hole. The key hole connection also comprises a protrusion. The slot and the protrusion are arranged to be relatively movable via the restricted neck between a first position, where the protrusion passes through the enlarged hole with play, and a second position, where the protrusion passes through the reduced hole under deformation. Preferably, the protrusion is arranged to pass through the reduced hole under elastic deformation in order to be snapped ("clipped") inside the restricted hole. The relative movement is preferably a sliding movement in a longitudinal direction of the windscreen wiper arm.

In a further preferred embodiment of a windscreen wiper arm according to the invention the protrusion comprises a shank in the first position passing through the enlarged hole with play and in the second position passing through the reduced hole under deformation, and an enlarged head abutting an inner wall of the reduced hole.

To enhance its elasticity in order to snap through the reduced hole, the protrusion preferably has an inner hole, preferably a concentric inner hole inside the shank.

In a further preferred embodiment of a windscreen wiper arm in accordance with the invention the enlarged hole and the reduced hole are blind holes. In the alternative, the enlarged hole and the reduced hole are through holes.

In a further preferred embodiment of a windscreen wiper arm according to the invention the protrusion is formed on one of the adapter and the nozzle, and the slot is formed on the other of the adapter and the nozzle. Particularly, one of the legs of the U-shaped cross-section of the adapter comprises the slot, and the nozzle comprises the protrusion extending inwardly in a direction towards the adapter. More in particular, one of the legs of the U-shaped cross-section of the adapter comprises two slots, and the nozzle comprises two corresponding protrusions extending inwardly in a direction towards the adapter.

In a further preferred embodiment of a windscreen wiper arm in accordance with the invention the nozzle is detachably connected to the adapter at a lateral side of the windscreen wiper arm in use facing towards the upward position. Hence, washing liquid sprayed by the nozzle onto the windscreen to be wiped is immediately washed away by the wiper blade. In the alternative, the nozzle is detachably connected to the adapter at a lateral side of the windscreen wiper arm in use facing towards the downward position.

In a further preferred embodiment of a windscreen wiper arm according to the invention the nozzle is made of a plastic material. The adapter is particularly made of metal.

BRIEF DESCRIPTION OF THE DRAWINGS

The invention will now be explained in more detail with reference to figures illustrated in a drawing, wherein.

DETAILED DESCRIPTION OF PREFERRED EMBODIMENTS

Figure 1:
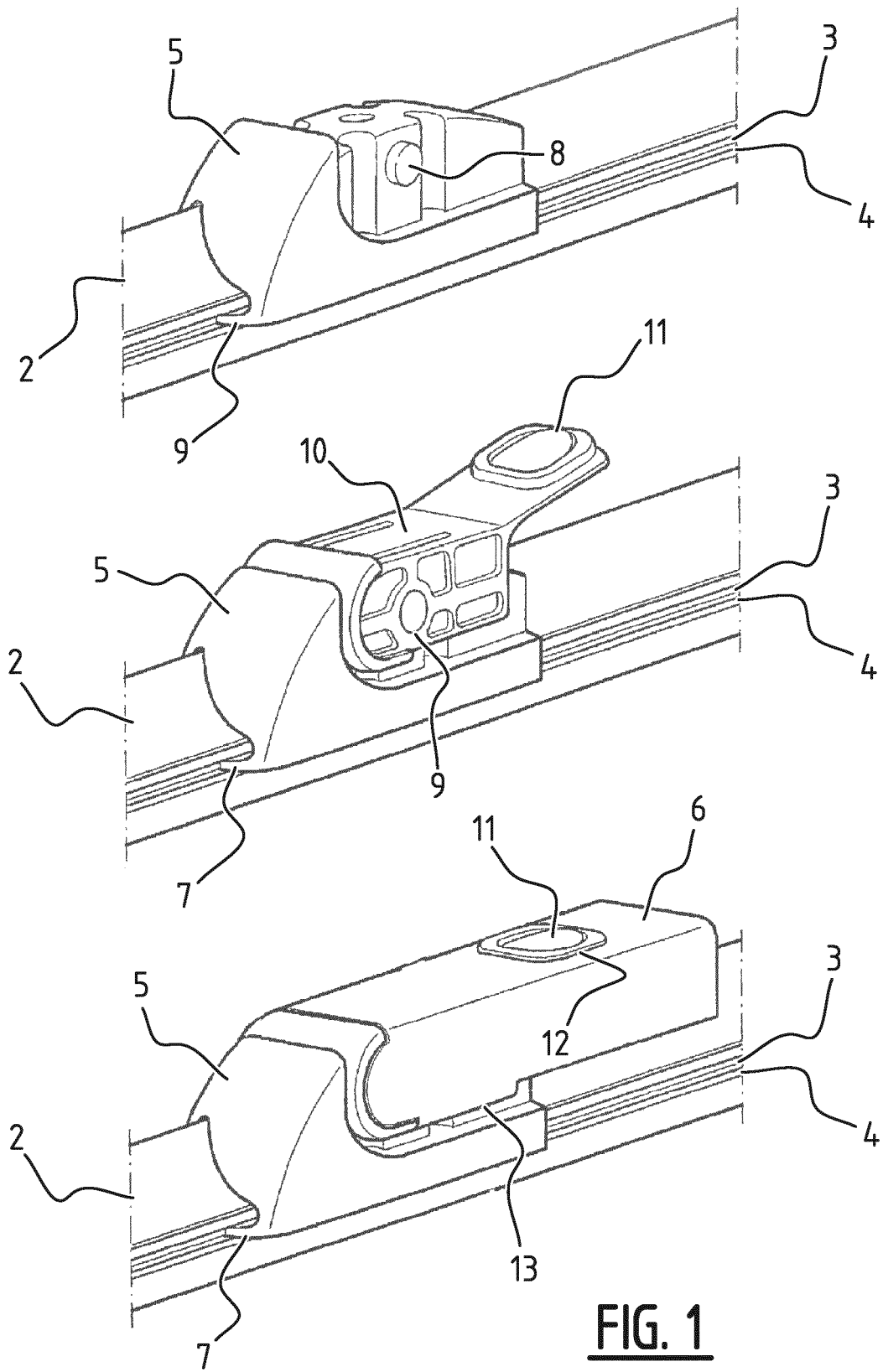
FIG. 1 shows details of a windscreen wiper device of the flat blade type illustrating successive steps for fitting a windscreen wiper arm to a connecting device of a wiper blade.
Figure 2A:
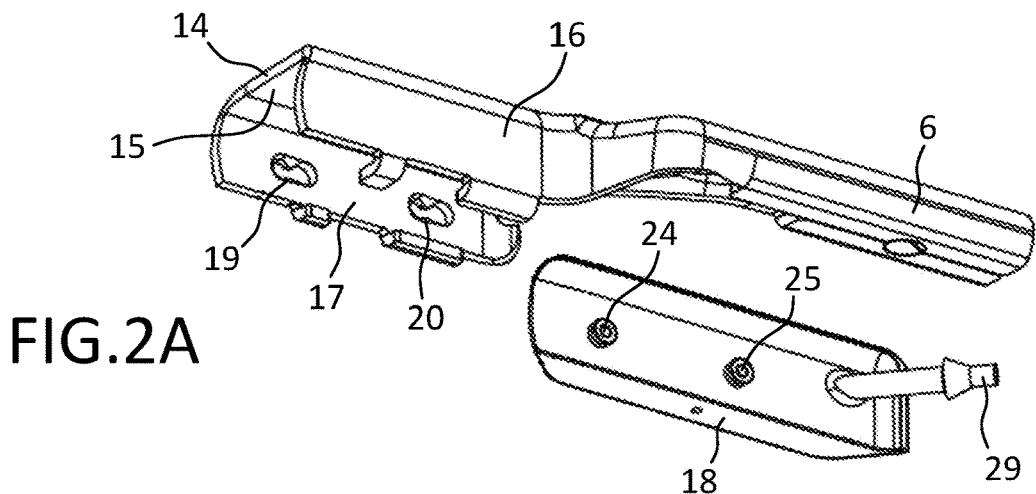
FIGS. 2A-2D show successive steps in connecting a nozzle to a windscreen wiper arm according to the invention.
Figure 2B:
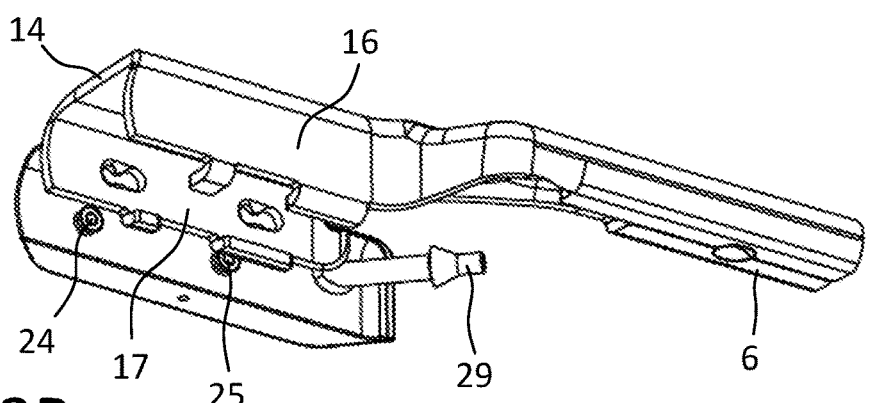
Figure 2C:
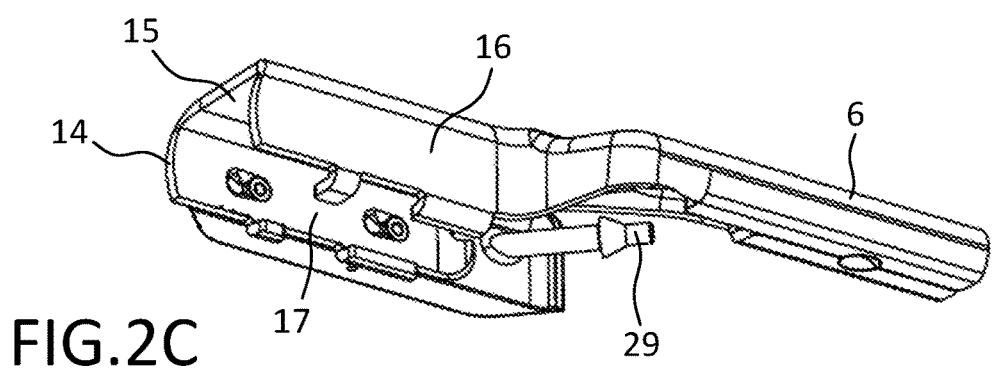
Figure 2D:
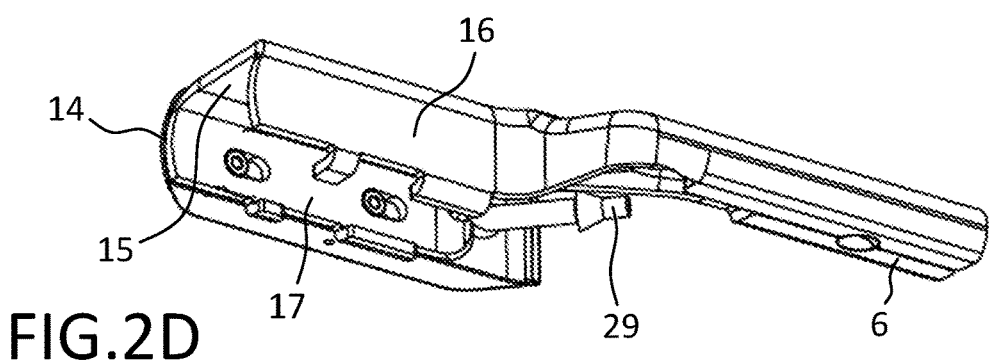

FIG. 1 shows a windscreen wiper device 1 of the flat blade type including a wiper blade 2 having opposing longitudinal grooves 3 formed in the longitudinal sides of the wiper blade 2. Longitudinal strips 4 ("flexors") made of spring band steel are fitted in the longitudinal grooves 3. The strips 4 form a flexible carrier element for the rubber wiper blade 2, which is thus biased in a curved position (the curvature in operative position being that of a windscreen to be wiped). The windscreen wiper device 1 also includes a connecting device 5 of plastic material for a windscreen wiper arm 6. The connecting device 5 comprises clamping members 7 that are integral therewith, which engage longitudinal sides of the strips 4 that face away from each other. Thus, the connecting device is firmly attached to the unit consisting of the wiper blade 2 and the strips 4. The windscreen wiper arm 6 is pivotally connected to the connecting device 5 about a pivot axis near one end thereof, and in the following manner. The connecting device 5 comprises two cylindrical protuberances 8 extending outwardly on either side of the connecting device 5. These protuberances 8 pivotally engage in identically shaped recesses 9 of a plastic joint part 10. The joint part 10 comprises a resilient tongue 11 extending outwardly, while the windscreen wiper arm 6 has an identically shaped hole 12. While mounting the windscreen wiper arm 6 onto the connecting device 5/joint part 10, the resilient tongue 11 is initially pushed in against a spring force and then allowed to spring back into the hole 12, thus snapping the resilient tongue 11 into the hole 12. This is called a bayonet connection. As shown, the joint part 10 has inwardly bent edges 13 serving to further enhance the retention of the connecting device 5/joint part 10 onto the windscreen wiper arm 6 in the vertical direction.

FIGS. 2A-2D show successive steps in connecting a nozzle 18 to a windscreen wiper arm 6 according to the invention. The windscreen wiper arm 6 may be connected to a connecting device 5 and/or joint part 10 through a bayonet connection, as explained in relation to FIG. 1. The windscreen wiper arm 6 is able to oscillate upwardly and downwardly between a downward position and an upward position. One end of the windscreen wiper arm is arranged to be pivotally connected to a mounting head mounted on a drive shaft (not shown), and another end of the windscreen wiper arm 6 is rigidly connected to an adapter 14 arranged to be connected to an elongated wiper blade (not shown) to be placed in abutment with a windscreen to be wiped. As shown, the adapter 14, at the location of its connection to the wiper blade, has a U-shaped cross-section with a base 15 and two spaced-apart legs 16,17. In this case, the U-shaped cross-section is mounted offset in a plane of the base 15 relative to a longitudinal axis of the windscreen wiper arm 6.

Figure 3A:
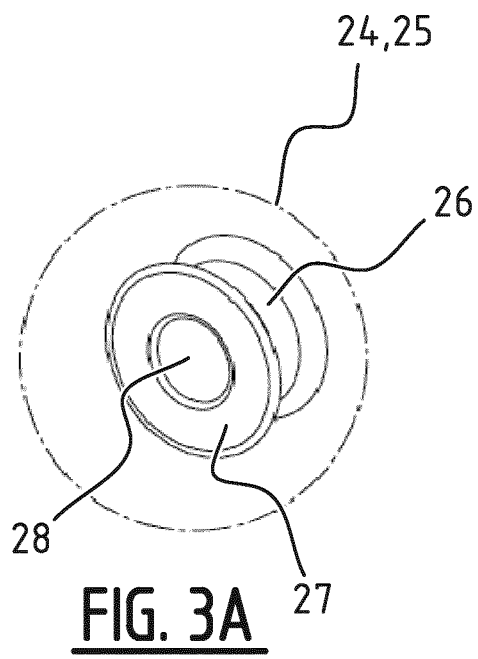
FIGS. 3A-3D show details of the key hole connection shown in FIGS. 2A-2D.
Figure 3B:
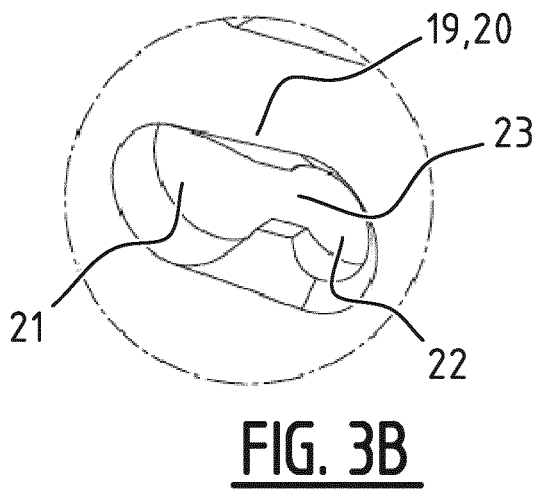
Figure 3C:
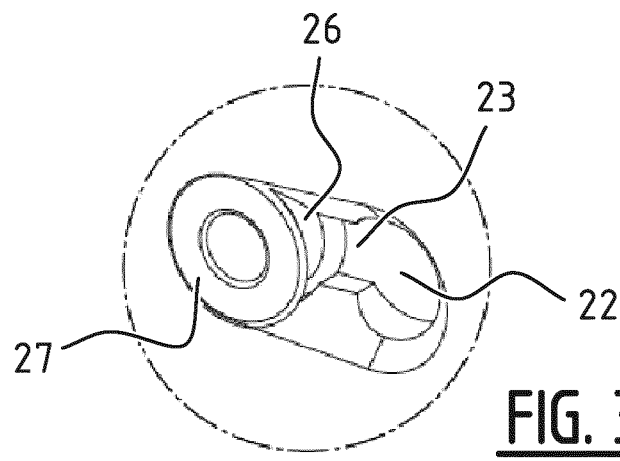
Figure 3D:
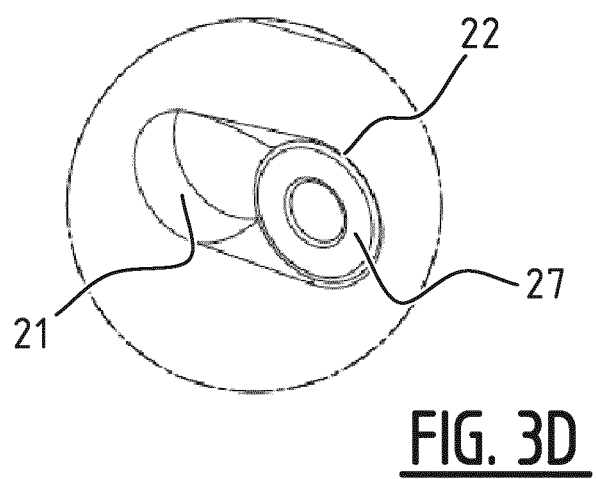

According to the invention and as depicted in FIGS. 2A-2D, the windscreen wiper arm 6 is provided with a nozzle 18 for spraying a washing liquid onto the windscreen to be wiped. The nozzle 18 is detachably connected to the adapter 14 through a key hole connection. The key hole connection comprises two slots 19,20 in one leg 17 of the U-shaped cross-section of the adapter 14. Referring to FIG. 3B, each slot 19,20 has an enlarged hole 21, a reduced hole 22 and a restricted neck 23 interconnecting the enlarged hole 21 and the reduced hole 22. Referring to FIGS. 2A-2D, the key hole connection also comprises a two protrusions 24,25 extending inwardly from a wall of the nozzle 18. Referring to FIGS. 3A-3D, each protrusion 24,25 includes a shank 26 and an enlarged head 27. Each slot 19,20 and its corresponding protrusion 24,25 are arranged to be relatively movable via the restricted neck 23 between a first position (FIGS. 2C and 3C), where the protrusion 24,25 passes through the enlarged hole 21 with play, and a second position (FIGS. 2D and 3D), where the protrusion 24,25 passes through the reduced hole 22 under elastic deformation. As depicted in FIGS. 3A-3D, the enlarged heads 27 abut a chamfered inner wall of the reduced hole 22 in the second position. To enhance its elasticity in order to snap through the reduced hole 22, each protrusion 24,25 preferably has an inner hole 28, preferably a concentric inner hole inside the shank 26.

FIGS. 3A-3D show the perspective details of FIGS. 2A-2D, where corresponding parts have been designated with the same reference numerals.

Figure 4:
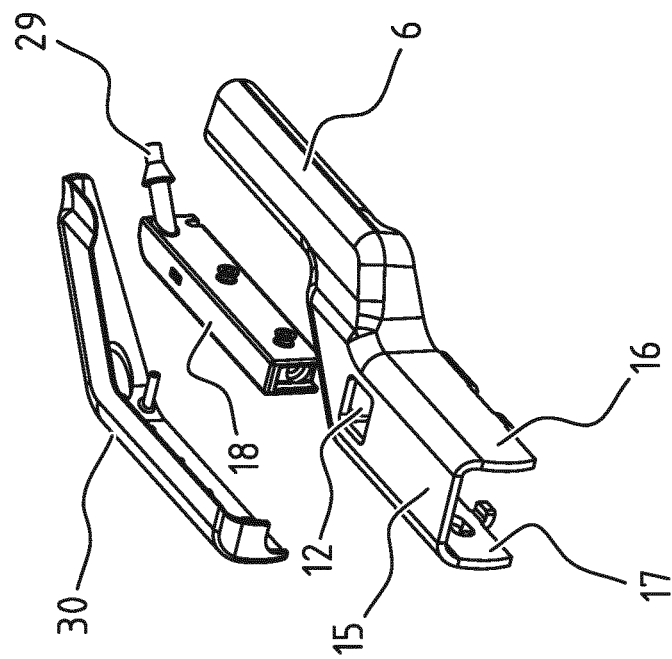
FIG. 4 shows perspective views of the adapter and the nozzle of FIGS. 2A-2D and 3A-3D with a cap (in a disassembled position) according to the invention.
Figure 4:
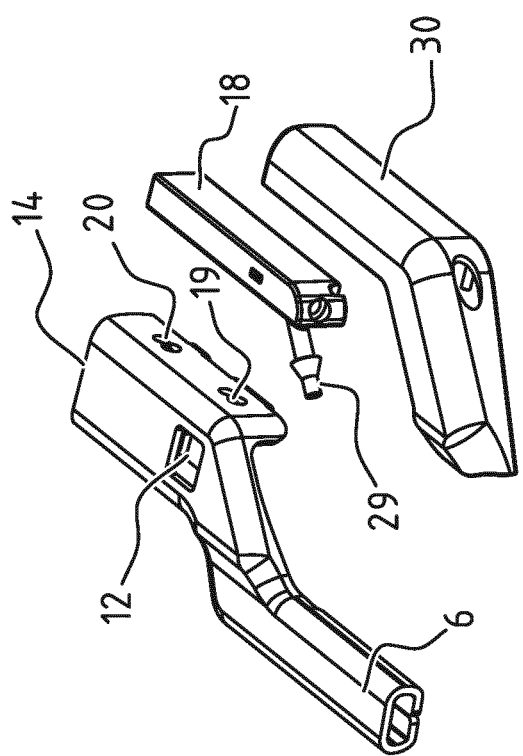
Figure 4:
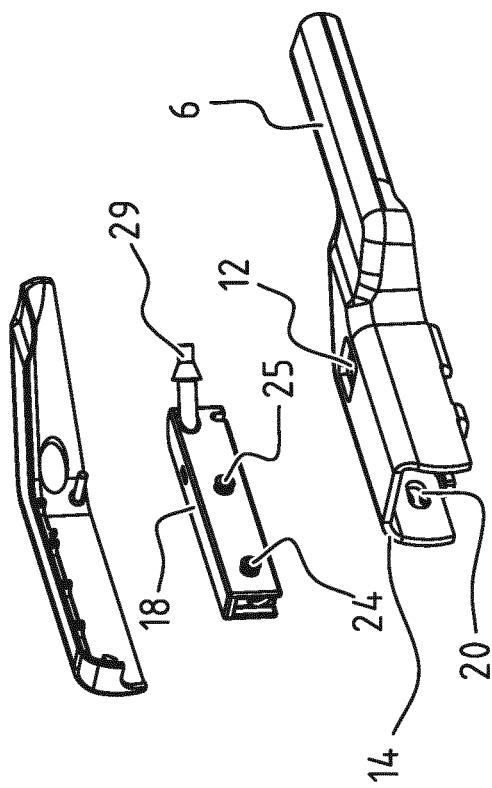

FIG. 4 shows perspective views of the adapter 14 and the nozzle 18 of FIGS. 2A-2D and 3A-3D where corresponding parts have been designated with the same reference numerals. As shown, the nozzle 18 has an elongated shape, and is provided with an inlet 29 for washing liquid. The inlet 29 is directed towards the windscreen wiper arm 6 in order to be connected to a supply channel (not shown) for the washing liquid located inside the windscreen wiper arm 6. Further, optionally, a cap 30 is provided to be detachably fixed to the nozzle 18 through a snapping operation. In this particular case the cap 30 is L-shaped and fully covers the nozzle 18, so that the latter is not visible from the outside.

The present invention is not restricted to the preferred variants shown, but extends also to other embodiments falling within the scope of the appended claims.

The invention claimed is:

1. A windscreen wiper arm comprising:
an adapter adapted to be connected to an elongated wiper blade to be placed in abutment with a windscreen to be wiped, wherein said adapter, at a location of its connection to the wiper blade, has a U-shaped cross-section with a base and two spaced-apart legs; and
a nozzle for spraying a washing liquid onto the windscreen to be wiped, wherein said nozzle is detachably connected to said adapter through a key hole connection, wherein said key hole connection comprises:
a slot having an enlarged hole, a reduced hole and a restricted neck interconnecting said enlarged hole and said reduced hole; and
a protrusion;
wherein said slot and said protrusion are arranged to be relatively movable via said restricted neck between a first position in which said protrusion passes through said enlarged hole with play, and a second position in which said protrusion passes through said reduced hole under deformation.

2. The windscreen wiper arm according to claim 1, wherein said protrusion is arranged to pass through said reduced hole under elastic deformation in order to be snapped inside said reduced hole.

3. The windscreen wiper arm according to claim 1, wherein said protrusion has an inner hole.

4. The windscreen wiper arm according to claim 1, wherein said protrusion comprises:
a shank in said first position passing through said enlarged hole with play and in said second position passing through said reduced hole under deformation, and
an enlarged head abutting an inner wall of said reduced hole in said second position.

5. The windscreen wiper arm according to claim 1, wherein said enlarged hole and said reduced hole comprise blind holes.

6. The windscreen wiper arm according to claim 1, wherein said enlarged hole and said reduced hole comprise through holes.

7. The windscreen wiper arm according to claim 1, wherein said protrusion is formed on one of said adapter and said nozzle, and wherein said slot is formed on another of said adapter and said nozzle.

8. The windscreen wiper arm according to claim 7, wherein one of said legs of said U-shaped cross-section of said adapter comprises said slot, and wherein said nozzle comprises said protrusion extending inwardly in a direction towards said adapter.

9. The windscreen wiper arm according to claim 7, wherein one of said legs of said U-shaped cross-section of said adapter comprises two slots, and wherein said nozzle comprises two corresponding protrusions extending inwardly in a direction towards said adapter.

10. The windscreen wiper arm according to claim 1, wherein said nozzle is detachably connected to said adapter at a lateral side of said windscreen wiper arm in use facing towards an upward position.

11. The windscreen wiper arm according to claim 1, wherein said nozzle is detachably connected to said adapter at a lateral side of said windscreen wiper arm in use facing towards a downward position.

12. The windscreen wiper arm according to claim 1, wherein said nozzle comprises a plastic material.

13. The windscreen wiper arm according to claim 1, wherein said adapter comprises a metal material.

14. The windscreen wiper arm according to claim 1, wherein said U-shaped cross-section of said adapter is mounted offset in a plane of said base relative to a longitudinal axis of said windscreen wiper arm.

15. A windscreen wiper arm comprising:
an adapter adapted to be connected to an elongated wiper blade to be placed in abutment with a windscreen to be wiped, wherein said adapter, at a location of its connection to the wiper blade, has a U-shaped cross-section with a base and two spaced-apart legs; and
a nozzle for spraying a washing liquid onto the windscreen to be wiped, wherein said nozzle is detachably connected to said adapter through a key hole connection, wherein said key hole connection comprises:
a slot having an enlarged hole, a reduced hole and a restricted neck interconnecting said enlarged hole and said reduced hole; and
a protrusion, wherein said protrusion has an inner hole and said protrusion is arranged to pass through said reduced hole under elastic deformation in order to be snapped inside said reduced hole;
wherein said slot and said protrusion are arranged to be relatively movable via said restricted neck between a first position in which said protrusion passes through said enlarged hole with play, and a second position in which said protrusion passes through said reduced hole under deformation.

* * * * *